(12) United States Patent
Shane

(10) Patent No.: US 11,498,172 B2
(45) Date of Patent: Nov. 15, 2022

(54) DUAL SPEED ROTARY TOOL

(71) Applicant: First Eastern Equities Limited, Boca Raton, FL (US)

(72) Inventor: Simon Richard Shane, Warwick (BM)

(73) Assignee: Air Turbine Technologies, Inc., Boca Raton, FL (US)

( * ) Notice: Subject to any disclaimer, the term of this patent is extended or adjusted under 35 U.S.C. 154(b) by 337 days.

(21) Appl. No.: 16/899,752

(22) Filed: Jun. 12, 2020

(65) Prior Publication Data

US 2020/0392858 A1 Dec. 17, 2020

Related U.S. Application Data

(60) Provisional application No. 62/860,538, filed on Jun. 12, 2019.

(51) Int. Cl.
| | | |
|---|---|---|
| *B23Q 5/16* | (2006.01) | |
| *F01D 15/06* | (2006.01) | |
| *B24B 23/02* | (2006.01) | |

(52) U.S. Cl.
CPC .............. *B23Q 5/165* (2013.01); *B24B 23/02* (2013.01); *F01D 15/062* (2013.01); *F01D 15/065* (2013.01)

(58) Field of Classification Search
CPC .... F01D 15/062; F01D 15/065; F01D 15/067; B23Q 5/12; B23Q 5/16; B23Q 5/165
See application file for complete search history.

(56) References Cited

U.S. PATENT DOCUMENTS

| | | | |
|---|---|---|---|
| 3,767,320 A * | 10/1973 | Theis, Jr. ............... | G05D 13/00 |
| | | | 415/36 |
| 5,261,233 A * | 11/1993 | Kishi ....................... | F01D 1/32 |
| | | | 60/436 |
| 5,566,770 A | 10/1996 | Bowser | |
| 6,644,420 B2 * | 11/2003 | Lay ....................... | B24B 23/026 |
| | | | 173/221 |
| 7,077,732 B2 | 7/2006 | Dodds | |
| 8,192,156 B2 | 6/2012 | Cheng | |
| 9,333,611 B2 | 5/2016 | Dotan et al. | |
| 2009/0060673 A1 | 3/2009 | Mace | |

OTHER PUBLICATIONS

International Search Report issued for PCT/US2020/037472.

* cited by examiner

*Primary Examiner* — Richard A Edgar
*Assistant Examiner* — Jason G Davis
(74) *Attorney, Agent, or Firm* — Fleit Intellectual Property Law; Jon Gibbons

(57) ABSTRACT

A high torque dual speed turbine rotor for a lightweight hand held tool for grinding and polishing or for use with a spindle mounted pneumatic machine. The high torque dual speed turbine rotor includes a two-piece shaft with flow control screw disposed within the shaft. The shaft includes a first set of hollow openings, at a first position from one end of the shaft, in fluid communications with a first annular chamber of a rotor. There is also a second set of hollow opening, at a second position from the one end of the shaft, in fluid communications with a second annular chamber of the rotor. The flow control screw moves inside a threaded axial bore of the shaft from an open position inside the axial bore to the closed position corresponding to the second set of hollow openings.

17 Claims, 10 Drawing Sheets

DUAL SPEED ROTARY TOOL

CROSS-REFERENCE TO RELATED APPLICATIONS

This application claims priority from and is related to the following prior application U.S. Provisional Application No. 62/860,538, filed Jun. 12, 2019, entitled "DUAL SPEED ROTARY TOOL." This prior application, including the entirety of the written description and drawing figures, is hereby incorporated into the present application by reference.

FIELD OF THE INVENTION

This disclosure generally relates to pneumatically powered, hand-held or spindle-mounted lightweight tools suitable for grinding and polishing and, more particularly, to a turbine rotor for a lightweight, grinding tool driven by an air-powered reaction turbine.

BACKGROUND

In the prior art, lightweight pneumatic tools have been used for a variety of functions, such as grinding, polishing, metal or plastic finishing, engraving, drilling, and deburring. The tool variations include hand-held and machine spindle-mounted embodiments. Hand-held tools often include a narrow cylindrical exterior housing that includes a handle portion enclosing the rotor and a drive shaft that is held much like a pencil or pen. Lightweight pneumatic grinding tools can be hand-held for longer periods of time than a comparable electric motor tool which is much heavier without harm to the user.

Although the torque provided in current turbine rotors is adequate for grinding and polishing tools that are lightweight and compact, higher torque in some applications of grinding and polishing is desirable. Tools have a set range of speed and cannot vary greatly from this range.

SUMMARY OF THE INVENTION

A high torque dual speed turbine rotor for a lightweight hand-held tool for grinding and polishing or for use with a spindle mounted pneumatic machine. The high torque dual speed turbine includes two or more chambers for the rotor and a two-piece shaft with a flow control screw disposed within the shaft. The shaft includes a first set of hollow openings, at a first position from one end of the shaft, in fluid communications with a first annular chamber of a rotor. There is also a second set of hollow openings, at a second position from the one end of the shaft, in fluid communications with a second annular chamber of the rotor. The flow control screw moves inside a threaded axial bore of the shaft from an open position inside the axial bore to the closed position corresponding to the second set of hollow openings.

In the open position, the flow control screw is not blocking the hollow openings of the second annular chamber. In this position, the flow control screw permits pressurized air flow into both the first annular chamber and the second annular chamber to achieve a higher first speed. Likewise, moving the internal flow control screw with a wrench from an open position to a closed position within the shaft will act to block airflow through the shaft to the second annular chamber member of the turbine rotor. This results in a lower speed.

In one example, the flow control screw includes at least one of a screw drive type of a slot head, a Phillips head, an Allen wrench, a Torx drive, a Robertson head or a combination thereof.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

The present invention provides a high torque dual speed rotor for handheld or machine mounted applications. The present invention leverages current designs for high-speed rotors with two or more annular chambers for the turbine by using a two piece shaft with an internal flow control screw. Moving the internal flow control screw with a wrench from an open position to a closed position within the shaft will act to block the pressurized airflow through the shaft to one of the annular chambers of the rotor. This results in a lower speed. Likewise, moving the internal flow control screw with a wrench from the closed position to an open position with direct the pressurized airflow through the shaft into the previously closed annular chamber of the rotor.

By leveraging the current designs of a high torque rotor, the present invention eliminates the need for a completely new rotor design. Only the shaft is to be modified to provide dual speeds with the use of the internal flow control screw.

Non-Limiting Terminology

The terms "a" or "an", as used herein, are defined as one or more than one. The term plurality, as used herein, is defined as two or more than two.

The term "another", as used herein, is defined as at least a second or more.

The term "and" in the phrase "one of A, B, and C" means either A or B or C or any combination of A, B, and C.

The term "air" is intended to broadly cover many different types of fluids, including oil mixed with air.

The terms "including" and "having" as used herein, are defined as comprising (i.e. open language).

The term "coupled" as used herein, is defined as "connected" although not necessarily directly, and not necessarily mechanically.

Various materials or combinations of materials can be used to construct the mounting collar assembly and its components. For example, materials such as metals, alloys, composites, plastics, ceramics, and other inorganic or organic materials or combinations thereof may be used.

Machining System

Figure 1:
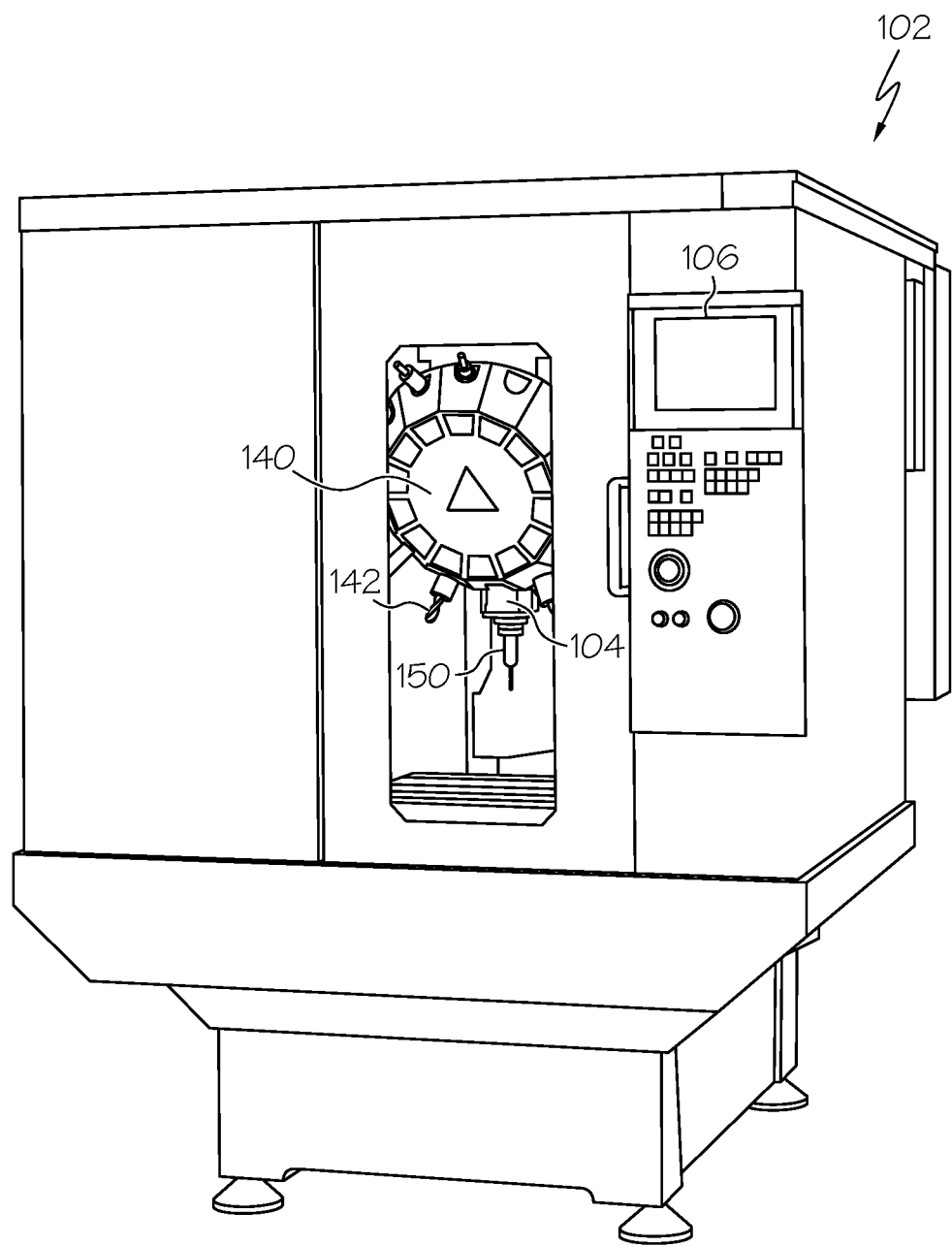
FIG. 1 is perspective view of an exemple machining system, in which the present invention may be installed.
Figure 2:
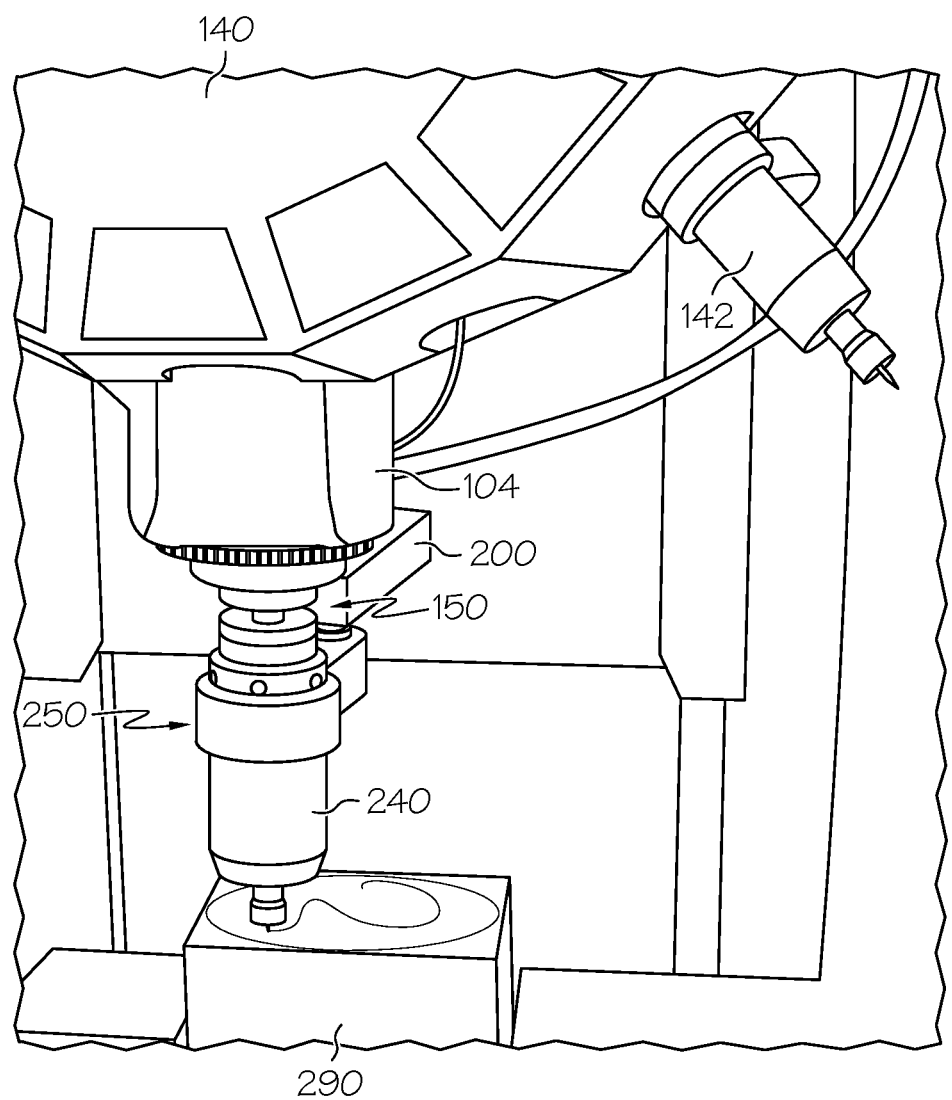
FIG. 2 is a perspective view of another portion of the system of FIG. 1.

Referring to the drawings and in particular to FIG. 1 and FIG. 2, a machining system is shown and generally represented by reference numeral 102. In this example, this is an auto changer spindle mounting assembly for a spindle-mounted pneumatic tool that is powered by a compressed fluid, such as air. System 102 can include a control device 104, such as a CNC machine, a tool carousel 140, and one or more tools or spindles 142. The control device 104 can include a user input device 106 for inputting commands. The control device 104 can utilize various computational hardware and software to implement a machining process on a workpiece, and the present disclosure is not intended to be limited based on the type of control utilized.

The system 102 can also have a universal spindle mounting assembly (USMA) 150 that cooperates with the spindles 142 to allow for automatic exchanging of the spindles with the CNC machine 104. In the exemplary embodiment of system 102, the spindles 142 are exchanged between the CNC machine 104 and the tool carousel 140 by way of an auto changer device, which will be explained later in greater detail. However, the present disclosure contemplates the use of other structures and techniques for connecting and disconnecting the spindles 142 with the CNC machine 104 through the use of the USMA 150, such as a linear carousel.

Referring to FIG. 2, the USMA 150 can include a mounting collar assembly 250 and a mounting block or manifold body 200. The mounting collar assembly 250 can be operably coupled to a mounting collar assembly 240, which holds the spindle 240 parallel to the earth as shown, while the mounting block or manifold body 200 can be operably coupled to the CNC machine 104. A workpiece 290 is shown being machined with system 102.

Dual Chamber Turbine

Figure 3:
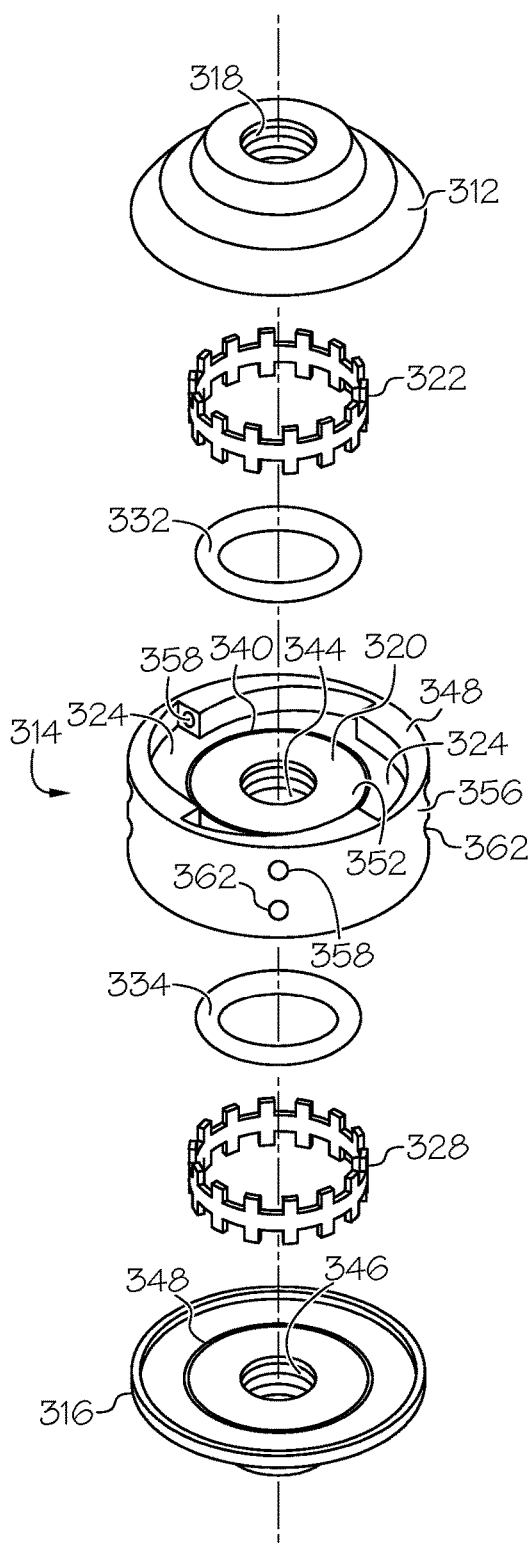
FIG. 3 is an exploded, perspective view of one example of a dual chamber turbine rotor found in the prior art.
Figure 4:
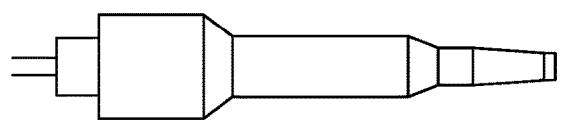
FIG. 4 is a side elevational view of an elongated tool housing in which the dual chamber turbine rotor of FIG. 3 is enclosed found in the prior art.

Referring now to the drawings, in particular FIG. 3 through FIG. 7, the instant turbine rotor is illustrated generally at 310. An outside elongated tool housing that is hand-held and that encloses the rotor, shaft and bearings is shown in FIG. 4. The turbine rotor 310 is used in a hand-held or spindle-mounted tool, as shown in FIG. 4, suitable for work such as grinding and polishing. The preferred embodiment is described in U.S. Pat. No. 7,077,732 and commonly owned herewith by Air Turbine Technology Inc., which is hereby incorporated by reference in its entirety.

Turning now to FIG. 3 is an exploded, perspective view of one example of a dual chamber turbine rotor found in the prior art. The turbine rotor body 310 preferably has two separate internal high-pressure air receiving chambers (a first chamber and a second chamber), formed by a front wall 312 (912 in the example in FIG. 9), a middle inner wall 314 (914 in the example in FIG. 9), and a back wall 316 (916 in the example in FIG. 9). The rotor body 310 is generally cylindrical. The front wall 312 and the back wall 16 may be identical. The front wall 312, inner wall 314 and back wall 316 fit together frictionally and are generally airtight. For example, the front wall 312 and the back wall 316 each have a peripheral flange that engages and extends over the edge of the periphery of the chamber walls of the middle wall 314. In one embodiment, the front wall 312 and the back wall 16 are press-fit against the middle wall 14. However, the front wall 312 and the back wall 316, and the inner wall 314 may also be glued together or releasably or permanently attached by other, equivalent elements such as a metal clip.

Figure 5:
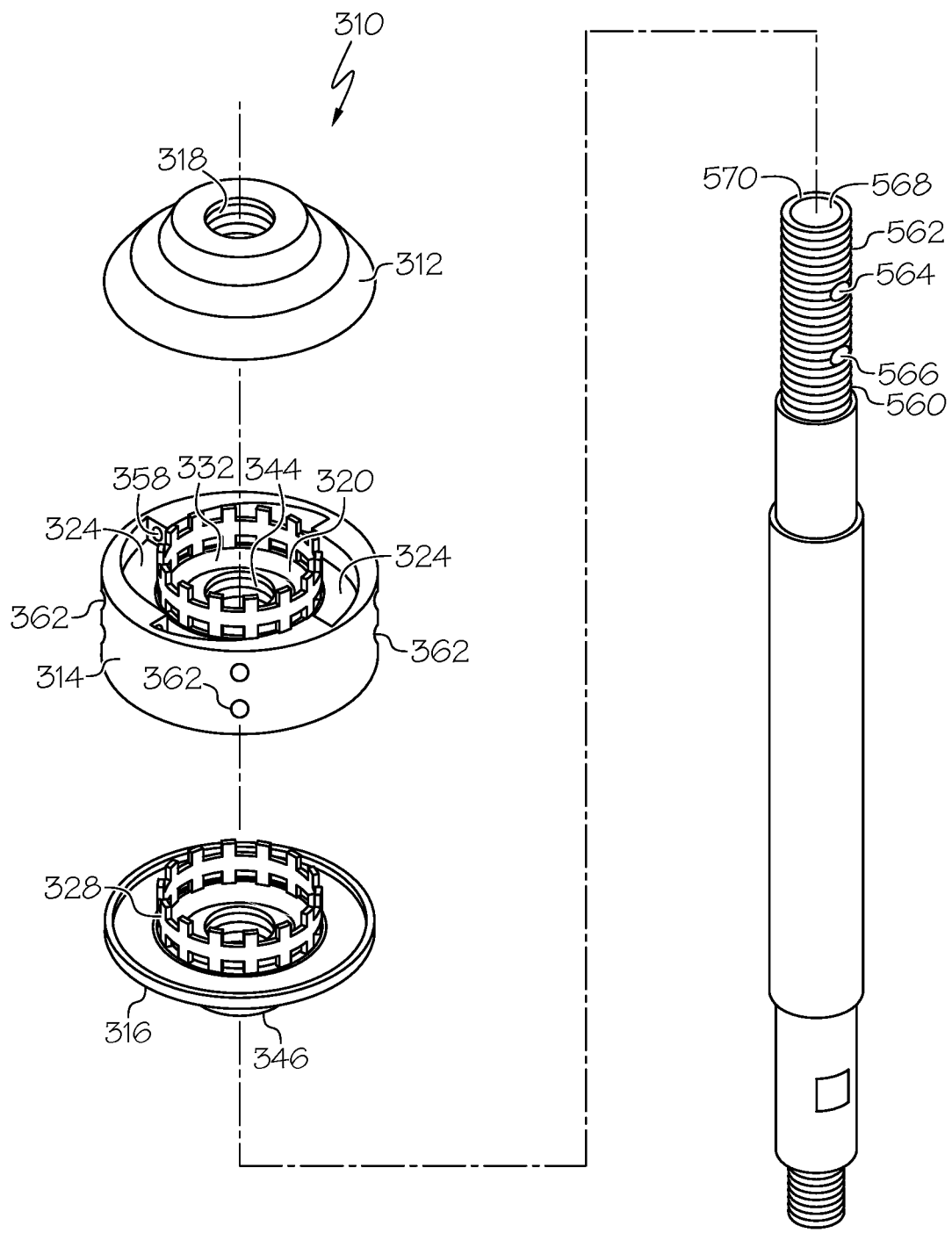
FIG. 5 is a cross-sectional, side elevational view of the dual chamber turbine rotor and corresponding drive shaft.
Figure 7:
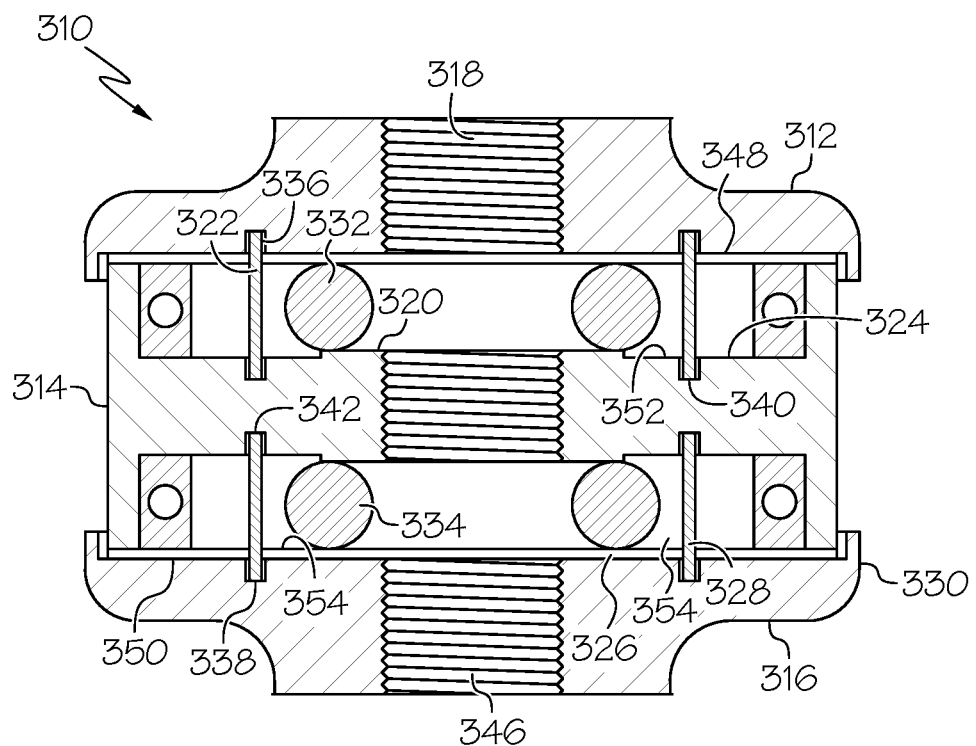
FIG. 7 is a cross-sectional side elevation view of the dual turbine rotor of FIG. 6 found in the prior art.
Figure 8:
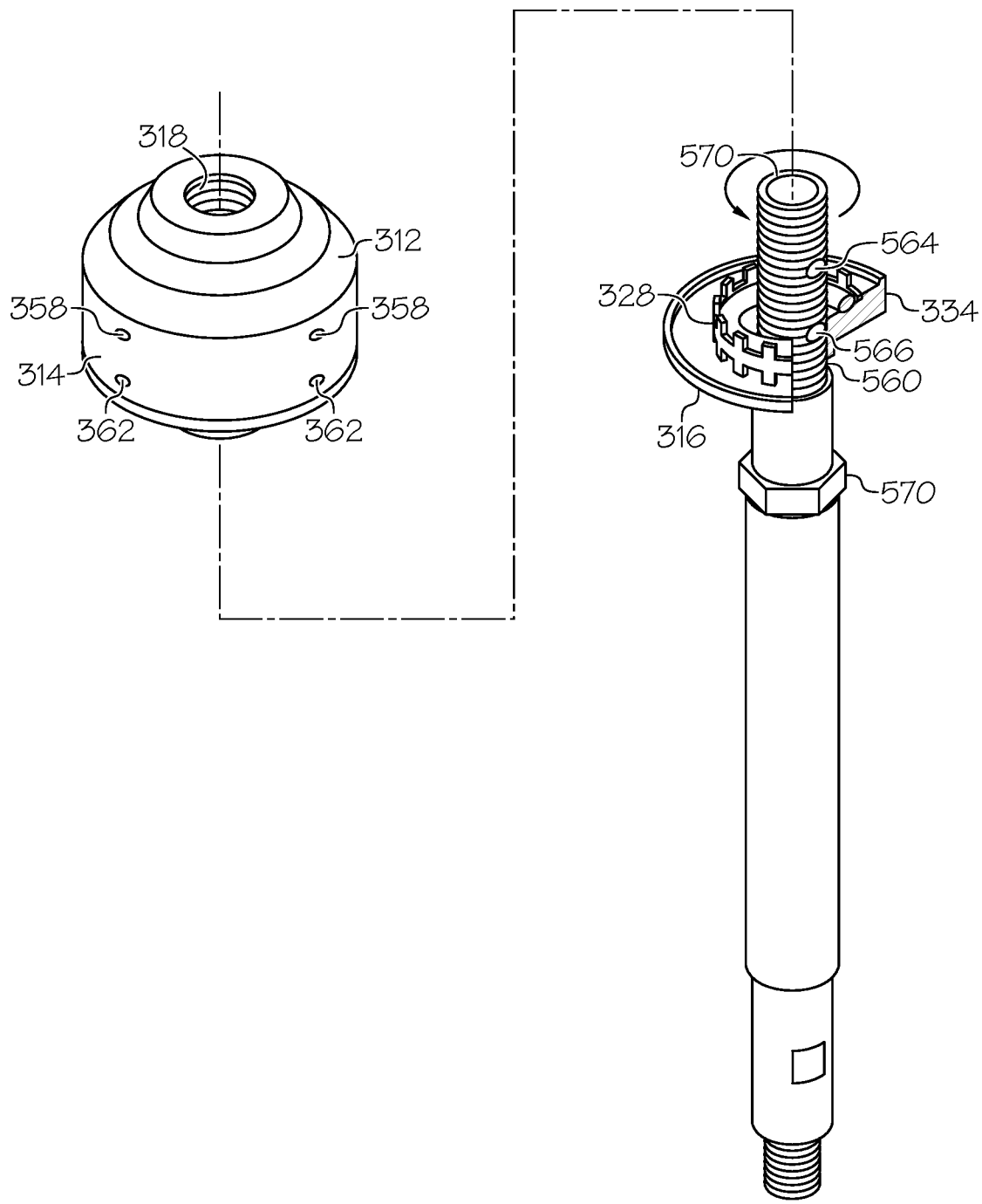
FIG. 8 is a partially exploded, sectional perspective view of the dual turbine rotor being mounted of FIG. 6 on the drive shaft.

The front wall 312 (912 in the example in FIG. 9) includes a central threaded bore 318. In the preferred embodiment, the bore 318 (958 in the example in FIG. 9) is threaded to correspond with threads on a drive shaft 560, as shown in FIGS. 5, 7, and 8. The top end of the drive shaft 560 (shown in FIG. 5) includes an outer threaded wall 562 with hollow openings 564, 566 that serve as inlets for high-pressure air to enter the rotor body 310 chambers to propel the rotor body 310. Further, the hollow openings 564 formed at a first position along the shaft from the top end 570, and the hollow openings 566 formed at a second position from the top end 570 on the shaft 560 as shown.

The hollow opening 564 is typically formed in sets of two or more at various radial a position on the shaft 560. In this embodiment, there is another hollow opening (not shown) formed on the back side of the shaft 560, i.e., 180 degrees from the opening 564. This set of two or more hollow openings 564 helps to maintain the balance of the shaft 560 and rotor. Likewise, hollow opening 566 includes another opening on the back side (not shown). In addition to the use of thread wall 562, other forms of attachment with the drive shaft 560, both releasable and permanent, are contemplated, such as gluing, welding, or frictional engagement with the drive shaft 560. The top-end 570 of the drive shaft 560 has an axial bore 568 that is in fluid communications with the hollow openings 564, 566.

Continuing with FIG. 3, the front wall 312 and the back wall 316 may be made of plastic, metal, or other suitable lightweight, rigid material that can be generally airtight. When the rotor body is engaged with the shaft, the torque produced on the rotor is transferred to the shaft, causing the shaft to rotate.

The common inner wall 314 may also be made from plastic, metal or other suitable material. The inner wall 314 includes a threaded central bore 344 to correspond with threads on the drive-shaft 560 of the tool.

The rotor body 310 in the preferred embodiment includes a governor in each rotor housing chamber as described in U.S. Pat. No. 4,776,752. Preferably, the governor comprises a first annular chamber area 320 on the front surface 348 of the inner wall 314. Extending from the outer portion 352 of the first annular chamber 320 is at least one first arcuate chamber 324. As shown in FIG. 3 thru FIG. 7, in the preferred embodiment, four (4) first arcuate chambers 324 are provided, which extend from the outer portion 352 of the first annular chamber 320 to the circumference 356 of the inner wall 314. The arcuate chambers 324 open to first circumferential openings 362 (962 in the example in FIG. 9).

A first resilient valve o-ring 332 is mounted in the first annular chamber 320 to regulate and restrict the flow of the air from the first annular chamber 320 to the first arcuate chamber 324. Extending away from the first valve o-ring 332 is an annular first perforated barrier 322. When high-pressure air (approximately 90 psi) is introduced into the rotor body 310, and the rotor speed reaches a predetermined number of revolutions per minute, the valve o-ring 332 deforms against the perforated barrier 322, thereby restricting airflow and decreasing the RPMs of the rotor.

Figure 6:
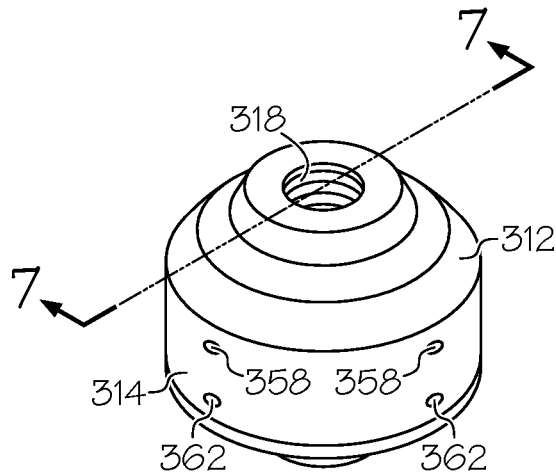
FIG. 6 is a perspective view of the dual chamber turbine rotor found in the prior art.

As shown in FIG. 6, the rotor body 310 includes a second annular chamber 326 on the rear surface 50 of the inner wall 14. Extending from the outer portion 354 of the second annular chamber 26 is at least one second arcuate chamber 330. In the preferred embodiment, four (4) second arcuate chambers 330 (90 degrees apart) are provided, which extend from the outer portion 354 of the second annular chamber 326 to the circumference 356 of the rotor body 10. The second arcuate chamber 330 opens to the second circumferential opening 362. As illustrated in FIG. 3 thru FIG. 5, the first arcuate chambers 324 and the second arcuate chambers 30 are aligned, as are the first and second circumferential openings 358, 362. The air passages openings 358, 362 are directionally tangential to the cylindrical rotor body 310 and expel high-pressure air tangentially to provide force to rotate the rotor body 310. However, the alignment of the openings 358, 362 is not necessary for the operation of the invention.

The second annular chamber 326 also contains a second resilient valve o-ring 334 to regulate and restrict the flow of the air from the second annular chamber 326 to the second arcuate chamber 330. Located radially away from the second valve O-ring 334 is an annular second perforated barrier 328. Thus, when the air is introduced into the turbine rotor 310, and the rotor reaches a predetermined RPM speed, the second resilient valve ring 334 deforms against the perforated barrier 328 as the rotor spins, thereby restricting airflow and slowing down the rotor.

The valve O-rings 332, 334 are generally resilient and are made of rubber. The entire turbine rotor 310 (except for the valve O-rings) may be made of rigid plastic materials. The turbine rotor 310 bearings do not need lubrication. The perforated barriers 322, 328 may be made of plastic, metal, or other suitable material. Also, the perforated barriers 322, 328 may be formed intrinsically with the inner wall 314, or releasably or permanently attached to the front surface 348 and the rear surface 350 of the inner wall 314. The perforated barriers 322, 328 may be a fence-like structure, as illustrated in FIG. 3. However, equivalent structures are also contemplated.

Also, in the preferred embodiment, a groove 336 in the front wall 312 and a corresponding groove 340 in the front surface of the inner wall 314 are situated, so the first perforated barrier 322 is aligned properly within the turbine rotor body 310. Similarly, a groove 38 in the back wall 16 and a corresponding groove 342 in the rear surface 350 of the inner wall 314 are situated, so the second perforated barrier 328 is aligned properly in the turbine rotor body 310. A single groove may also be used to properly align the perforated barrier.

In operation, the preferred embodiment of the turbine rotor 310 works as follows. Air under pressure (approximately 90 psi) enters the turbine rotor 310 from the drive shaft 560 into the central bores 318, 344, 346 in the front wall 312, inner wall 314, and back wall 316. The air under pressure enters the first and second annular chambers 320, 326 and travels around the first and second valve O-rings 332, 334 through the first and second perforated barriers 322, 328 into the first and second arcuate chambers 324, 330. The air then is forced under pressure from the arcuate chambers 324, 330 through circumferential openings 358, 362 in the circumference 356 of the inner wall 314. These peripheral openings operate as tangential nozzles, providing air streams generating torquing force to rotate the turbine. The reactive force of the air causes the turbine rotor 310 to rotate.

The preferred embodiment includes revolutions per minute ""("RPM" "") governor described in U.S. Pat. No. 4,776,752 in each drive chamber, which is commonly owned herewith by Air Turbine Technology Inc. and hereby incorporated by reference in its entirety. The resilient deformation of the valve O-rings 332, 334 against the perforated barriers 322, 328 caused by centrifugal force forces the turbine 310 to turn at a predetermined, somewhat constant rate. As the turbine rotor 310 rotates at a high RPM speed, the first and second valve O-rings 332, 334 deform, pressing against the perforations of the first and second perforated barriers 322, 328. The deformation of the valve O-rings 332, 334 restricts airflow through the perforations in the barriers 322, 328, thereby reducing rotational forces. Eventually, equilibrium is reached whereby a constant speed of rotation for the turbine rotor 310 is achieved.

The torque of the turbine rotor 310 in the present invention is greatly increased over that of prior art rotors. For example, when compared to two stacked turbine rotors, the present invention provides less weight, vibration, chatter, and run-through of the air and fewer moving parts that may wear.

Alternate Embodiment of Dual Chamber Turbine

Figure 9:
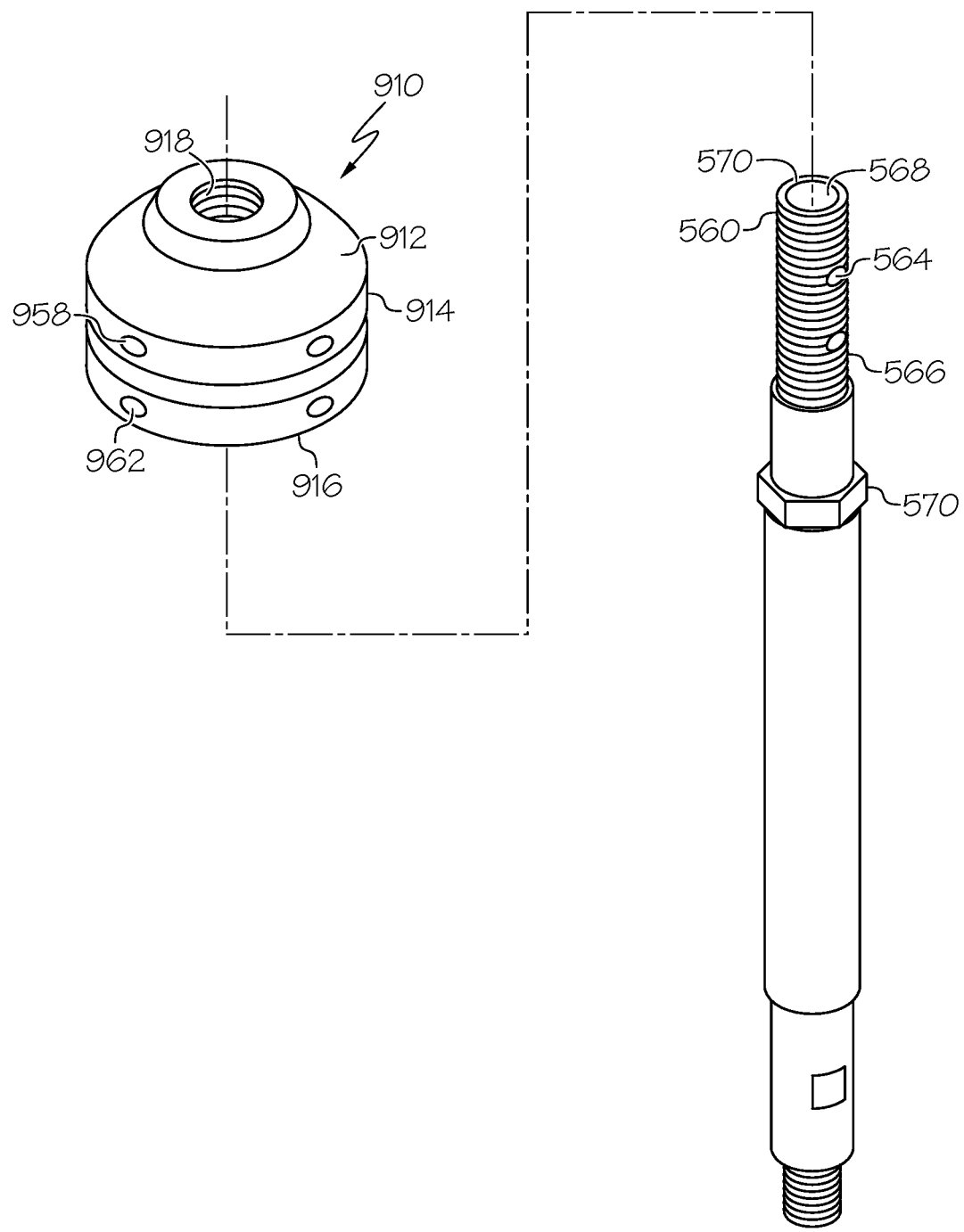
FIG. 9 is a perspective view of a dual chamber turbine rotor and corresponding drive shaft of an alternative embodiment.
Figure 10:
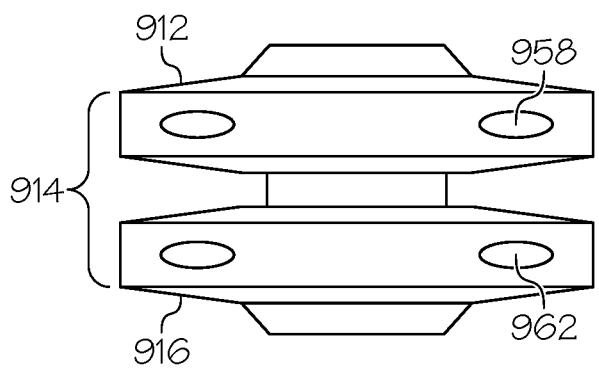
FIG. 10 is a side elevation view of an alternative embodiment of the dual chamber turbine rotor of FIG. 9.

FIGS. 9 and 10 illustrate an alternative embodiment of the invention. As shown in FIGS. 9 and 10, the rotor housing is narrowed for less weight and a further increase in torque.

The design of the turbine rotor 310 with multiple annular chambers and multiple arcuate chambers provides an increase in torque from prior art air turbines without a significant increase in the weight of the spindle apparatus. Moreover, there is less vibration than would be if single turbine rotors were stacked on top of each other. It is also contemplated in an alternative embodiment that additional annular chambers and arcuate chambers could be formed between in the first and second chambers. These additional chambers may have valve O-rings and perforated barriers as described herein for governing the RPMs. Furthermore, although the invention has been described to work with air, other gases are also contemplated for other applications.

Two Piece Drive Shaft with Flow Control Screw

Figure 11:
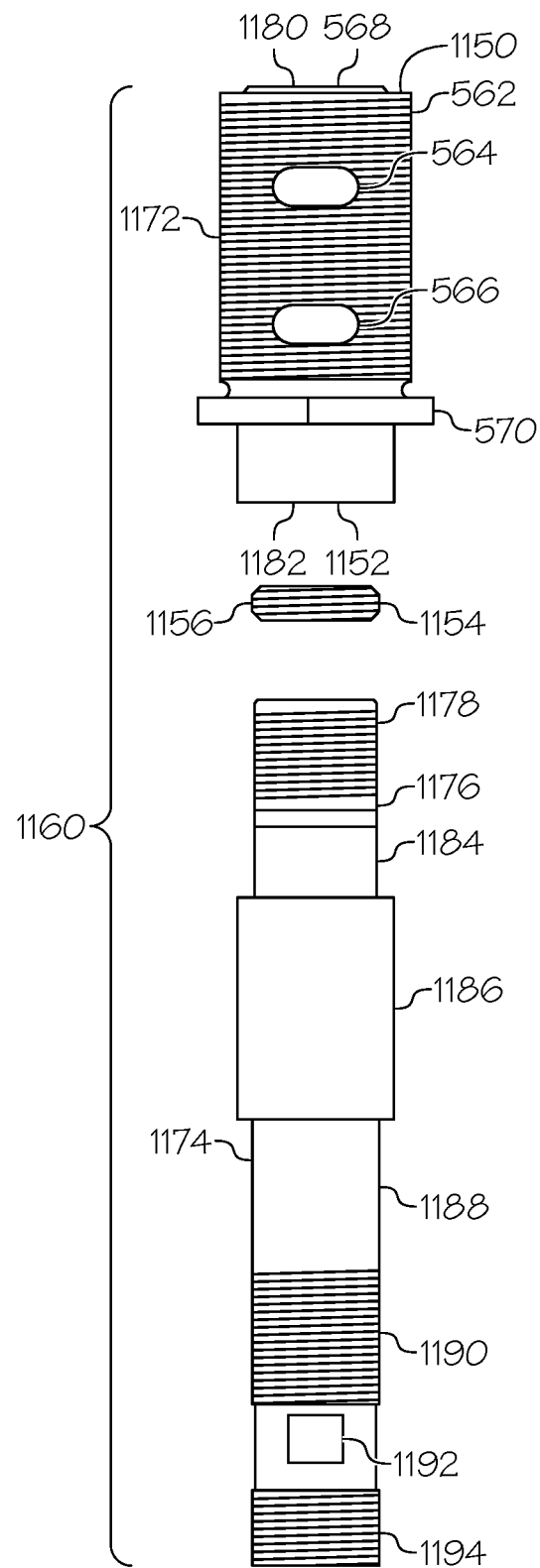
FIG. 11 is an exploded, sectional perspective view of the two-piece drive shaft.

Turning now to FIG. 11, shown is an exploded, sectional perspective view of the two-piece drive shaft 1160. The top shaft 1172 and bottom shaft 1174 are shown. Although this example is shown as a two-piece design, the flow control screw can work with three or more pieces or in the alternative just a one-piece shaft as well. The top shaft 1172 includes an axial bore 1160 thru top shaft 1172 to the other end 1150. The top shaft 1172 includes an outer wall 1162, which is shown in this example as threaded. However, the threaded wall is just an example of mounting the rotor 310 onto the shaft 1160. Other types of mounting or coupling metal to metal including press-fit, dowels, screws, welding, or a combination thereof. The outer wall comprises hollow openings 564, 566. The axial bore 1160 is in fluid communications with the hollow openings 564, 566, and the other end 1182. A flow control screw 1154 includes outer threads 1156 as shown, and the other end 1182 includes inner threads 1152 to enable rotatable engagement therebetween. The flow control screw 1154 includes at least one screw drive type. Screw drive type includes screw drive type of a slot head, a Phillips head, an Allen wrench, a Torx drive, a Robertson head, and other screw head types are contemplated within the true scope of the claimed invention.

The bottom end 1174 includes a first end 1176 with threads 1178 for rotatably fasten with the inner threads 1152 of the top shaft 1172. Continuing further from the first end 1176 of the bottom shaft 1174, are bearing surfaces 1184, 1188 separated by a bearing stop 1186. A set of threads for mounting a deflector, a set of wrench flats 1192 (another flat is on backside not shown) and a threads 1194 for a collet nut.

Figure 12:
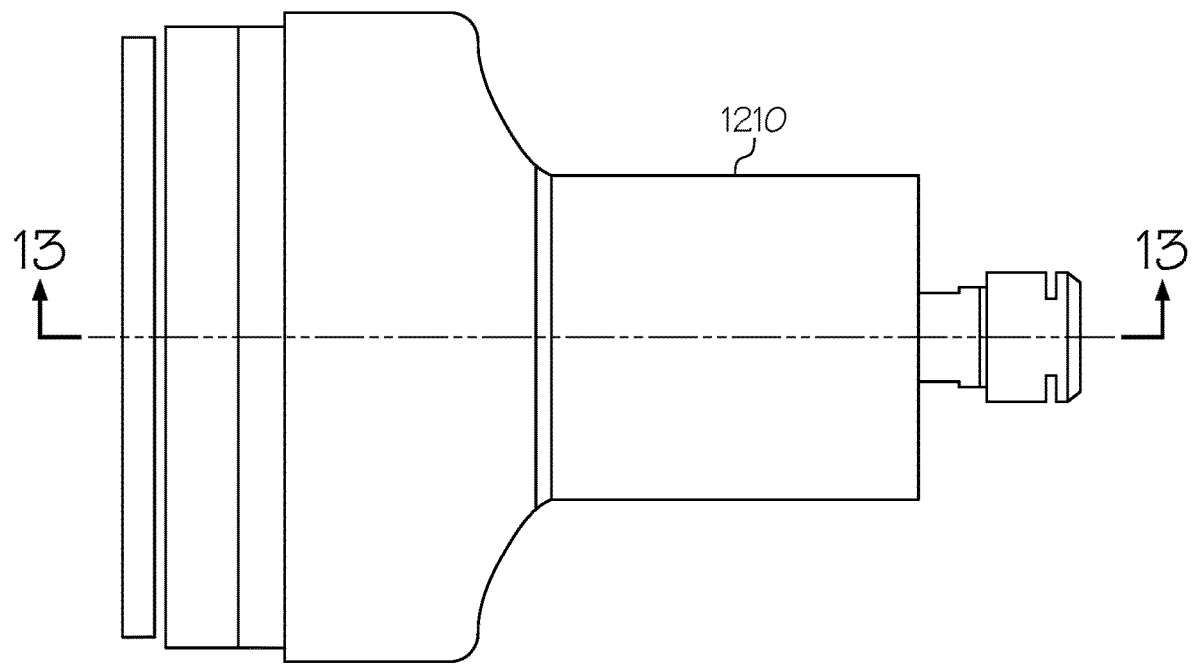
FIG. 12 is side view of the tool housing with a dual chamber turbine mounted on the two piece drive shaft of FIG. 11.
Figure 13:
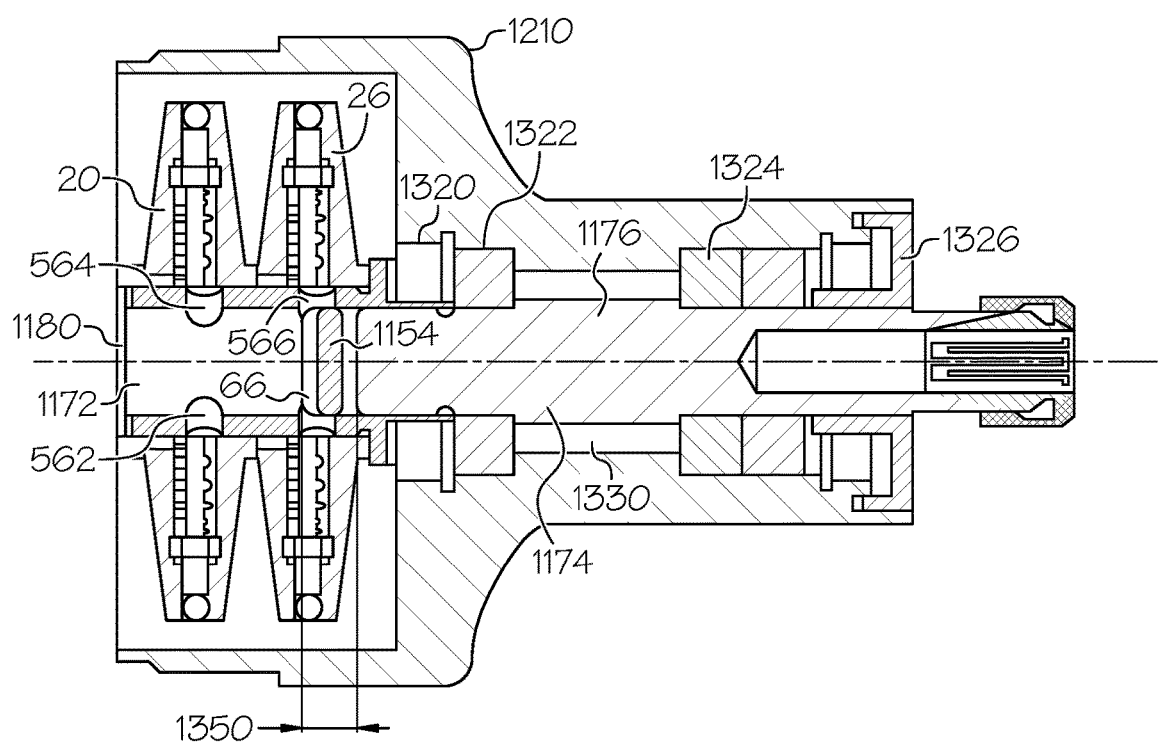
FIG. 13 is a cross-sectional side view of FIG. 12 taken along line A-A' illustrating the position of the flow control screw.

Turning now to FIG. 12 is side view of the tool housing with a dual chamber turbine rotor body 1210 mounted on the two piece drive shaft of FIG. 11. FIG. 13 is a cross-sectional side view of FIG. 12 taken along line A-A', illustrating the position of the flow control screw 1154. Air or pressurized fluid enters into the axial bore 1180 of the top-end 1172. The outer wall comprises a first set of one or more hollow openings 564 at a first position from the top or first end 1150 of top shaft 1172.

The outer wall comprises a second set of hollow openings 566 at a second position from the top or first end 1150 of top shaft 1172. The axial bore 1180 that is in fluid communications with the hollow openings 564, 566 provides pressurized air to both the first annular chamber 320 and the second annular chamber are 326 in the rotor 310 when the flow control screw 1154 is in an open position from the end of shaft end 568. The amount of travel 1350 of the flow control screw 1154 is defined by the threaded end 1176 of bottom shaft 1174 and by the depth of the inner threads running from end 1182 towards the top 568. In this open position, the flow control screw 1154 is not blocking the hollow openings 566 of the second annular chamber 326. In this position, the flow control screw 1154 permits pressurized air flow into both the first annular chamber 20 and the second annular chamber 326 to achieve a higher first speed.

To achieve a second lower speed, the airflow to the second annular chamber is partially or fully shut off. In this case, the flow control screw 1154 is repositioned to from not blocking the hollow opening 366 to the second annular chamber to a position that blocks the hollow opening 366 within the axial bore 568. A tool such as a screw drive with a bit that corresponds to the drive head of the flow control screw 1154 can be inserted in the end 1150 to reposition the flow control screw from an open position inside the axial bore 1158 to the closed position corresponding to the hollow openings 366. Also shown is a housing 100 that surrounds the rotor 1210 and the shaft 1160. Continuing further down the shaft towards the cutting or polishing bit is a spanner nut 1320, bearings 1322, empty space or void 1330 and 1326 separated by a bearings stop 1186 and deflector 1326 to protect the bearing 1324.

In the prototype of this invention, the inventor has demonstrated both 40,000 and 25,000 RPMs at 90 PSI (6.2 Barr) of pressure. Other speeds and air pressures are possible within the true scope and spirit of the present invention.

Non-Limiting Examples

The instant invention has been shown and described herein in what is considered to be the most practical and preferred embodiment. It is recognized, however, that departures may be made therefrom within the scope of the invention and that obvious modifications will occur to a person skilled in the art.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention but that the invention will include all embodiments falling within the scope of the appended claims.

What is claimed is:

1. A dual speed rotor for a hand held or spindle mounted pneumatic tool, comprising:
   a drive shaft with a first end and a second end and an outer wall, the first end including an axial bore and a first set of openings in the outer wall at a first position from the first end and a second set of openings in the outer wall at a second position from the first end, the axial bore in fluid communications with the first set of openings and the second set of openings;
   a turbine rotor having a first annular chamber in fluid communication with the first set of openings of the drive shaft and a second annular chamber in fluid communications with the second set of openings in the drive shaft; and
   a flow control screw for mechanically coupling within the axial bore inside the first end of the drive shaft to move between a third position from the end of the first end of the drive shaft and the second position of the drive shaft to restrict or stop the fluid communications between the axial bore and the second set of openings.

2. The dual speed rotor of claim 1, wherein the first end includes internal threads inside the axial bore and the flow control screw is rotatably engaging the internal threads of the drive shaft to move between the third position from the first end of the drive shaft and the second position of the drive shaft to break the fluid communications between the axial bore.

3. The dual speed rotor of claim 1, wherein the flow control screw is at least one of screw drive type of a slot head, a Phillips head, an Allen wrench, a Torx drive, a Robertson head or a combination thereof.

4. The dual speed rotor of claim 1, wherein the turbine rotor further comprises:
   an outer wall and an axis of rotation, the turbine rotor mechanically coupled to the drive shaft for rotation about the axis of rotation on the drive shaft, the turbine rotor having an inner wall and at least the first annular chamber and the second annular chamber for receiving high-pressure air from the first set of openings and the second set of openings, the turbine rotor having an air passage in each of the at least the first annular chamber and the second annular chamber, the air passage ending in tangential peripheral nozzles in the outer wall of the turbine rotor, the tangential peripheral nozzles directing a pressurized fluid therefrom to impart rotation to the turbine rotor and the drive shaft.

5. The dual speed rotor of claim 4, further comprises:
a first RPM governor with
   a first front wall;
   at least one first spiraling wall barrier extending from an outer portion of the first annular chamber;
   a first valve O-ring and a first annular performed barrier disposed in the first annular chamber; and
   a first back wall;
a second RPM governor with
   a second front wall;
   at least one second spiraling wall barrier extending from an outer portion of the second annular chamber;
   a second valve O-ring and a second annular perforated barrier disposed in the second annular chamber; and
   a second back wall.

6. The dual speed rotor of claim 5, wherein each perforated barrier is integral with a rotor body of the dual speed rotor.

7. The dual speed rotor of claim 5, wherein the first valve O-ring and the second valve O-ring are resilient rubber.

8. The dual speed rotor of claim 5, wherein the RPM governor except for the first valve O-ring and the second valve O-ring are made of plastic.

9. The dual speed rotor of claim 4, wherein four arcuate chambers radiate from each annular chamber.

10. The dual speed rotor of claim 4, wherein a front wall and a front interior surface of the inner wall are grooved for fitting a first perforated barrier, and a back wall and a back interior surface of the inner wall are grooved for fitting a second perforated barrier.

11. The dual speed rotor of claim 10, wherein the front wall and the back wall are releasably attached to the inner wall.

12. The dual speed rotor of claim 11, wherein the front wall and the back wall are attached to the inner wall by frictional force.

13. The dual speed rotor of claim 4, wherein the inner wall comprises a narrow waist.

14. The dual speed rotor of claim 4, wherein the tangential peripheral nozzles in communication with the first annular chamber are aligned with the tangential peripheral nozzles in communication with the second annular chamber.

15. A machining system with a dual speed rotor comprising:
a dual speed rotor;
a CNC machine;
an auto changer device;
a mounting collar assembly for holding a dual speed rotor;
the dual speed rotor including
   a drive shaft with a first end and a second end and an outer wall, the first end including an axial bore and a first set of openings in the outer wall at a first position from the first end and a second set of openings in the outer wall at a second position from the first end, the axial bore in fluid communications with the first set of openings and the second set of openings;
   a turbine rotor having a first annular chamber in fluid communication with the first set of openings of the drive shaft and a second annular chamber in fluid communications with the second set of openings in the drive shaft; and
   a flow control screw for mechanically coupling within the axial bore inside the first end of the drive shaft to move between a third position from the end of the first end of the drive shaft and the second position of the drive shaft to restrict or stop the fluid communications between the axial bore and the second set of openings.

16. The machining system with a dual speed rotor of claim 15, wherein the first end includes internal threads inside the axial bore and the flow control screw is rotatably engaging the internal threads of the drive shaft to move between the third position from the first end of the drive shaft and the second position of the drive shaft to break the fluid communications between the axial bore.

17. The machining system with a dual speed rotor of claim 15, wherein the flow control screw is at least one of screw drive type of a slot head, a Phillips head, an Allen wrench, a Torx drive, a Robertson head or a combination thereof.

\* \* \* \* \*